Sept. 8, 1942.                R. J. FISHER                    2,295,102
                        ADVERTISING SCHEDULE DEVICE
                           Filed Sept. 15, 1941
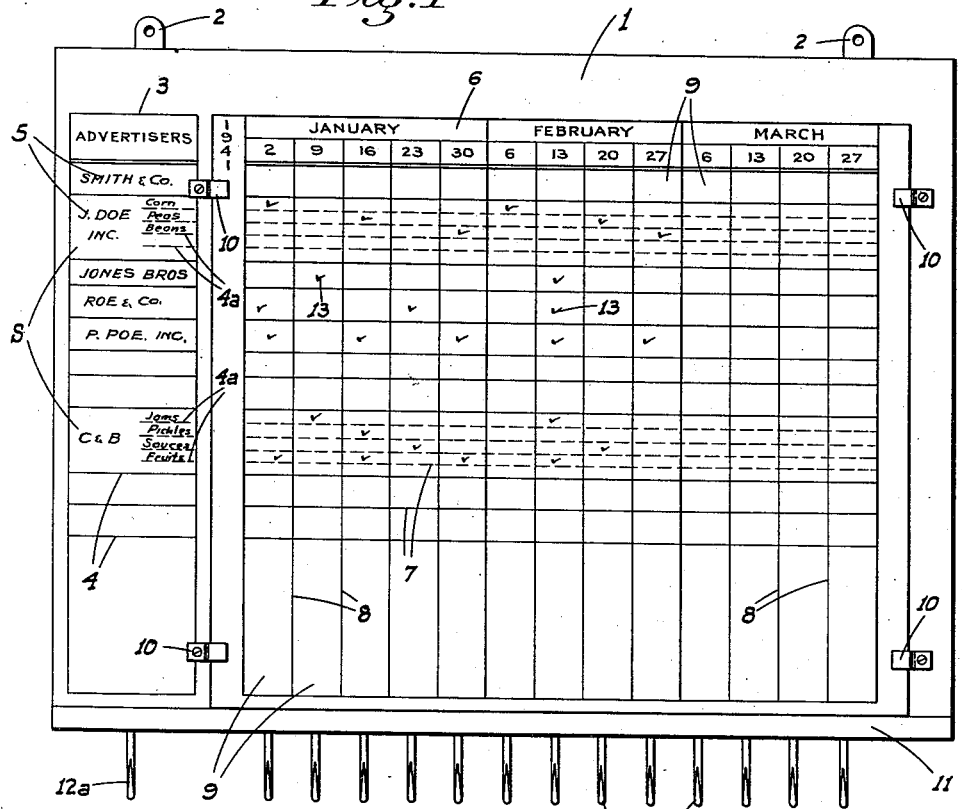
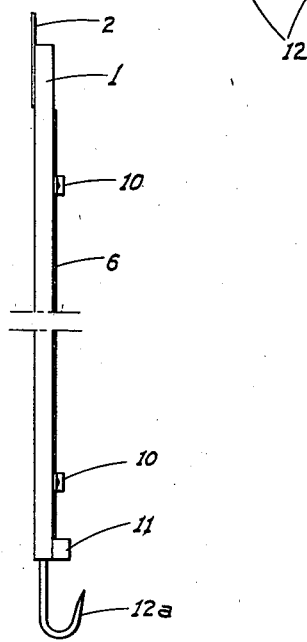
INVENTOR
R. J. Fisher
BY
Webster & Webster
ATTYS Patented Sept. 8, 1942

2,295,102

UNITED STATES PATENT OFFICE 2,295,102

ADVERTISING SCHEDULE DEVICE

Richard J. Fisher, Fresno, Calif.

Application September 15, 1941, Serial No. 410,831

2 Claims. (Cl. 283—66)

This invention relates to a device to be used in connection with advertising operations.

Merchants operating stores and selling goods of various large manufacturing companies, are frequently contracted by such companies to run a certain amount of advertising of their goods locally in connection with the individual advertisements of the merchants, the latter being paid a certain amount for such advertisements. Many merchants, however, have no particular system for keeping track of the number of times they run the allotted advertisement of any certain manufacturer, and on which the contract is based, and they are thus apt to get into difficulties under their contracts if they are unable to show that they have properly carried out the same.

The principal object of my invention therefore is to provide a device by means of which a merchant may easily keep track of the manufacturers with whom he has advertising contracts, and the number of times, together with the dates, on which he has run the advertisements as contracted. In this way the merchant will know at a glance whether he is fulfilling his contracts with any or all of the companies with which he is thus affiliated, and he will also know when he has used up the allotted amount of advertising. Also any manufacturer's agent, upon coming into the store, can easily and quickly check up for himself to determine as to whether or not the merchant is properly fulfilling his contract. Means is also provided on the device to retain the proof sheets of the advertisements run, so that said manufacturer's agent may have actual proof of the advertisements as made, and the dates on which they were run.

Another advantage is that the merchant is aided in determining what product to advertise, and when making up the ad, to readily see what has or has not been duly advertised.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a front elevation, foreshortened, of my improved advertising schedule device as being used.

Figure 2 is an end elevation of the same.

Referring now more particularly to the characters of reference on the drawing, the device comprises a rectangular back board or panel 1 of suitable rigid material having means to support the same against a wall, such as orificed hanger elements 2. At the left-hand side of the panel a vertical column 3 is printed, or otherwise permanently impressed thereon, said column being horizontally lined, as at 4, to provide spaces for the names of the various manufacturing companies whose products are to be advertised, as indicated at 5, and which names are inserted by the individual merchant using the device. Some of the spaces formed between the lines are deeper than others, as shown at S, and such spaces are subdivided by lines 4a. These spaces are provided for those advertisers putting out different lines of products to be individually or separately advertised, as indicated on the drawing. The lines 4 terminate short of the bottom of the column 3, thus leaving room for the merchant to add additional differently spaced lines should this be rendered necessary by the needs of some advertisers.

Arranged to cooperate with the panel is a schedule sheet 6, of rectangular form and substantially symmetrical to the panel, but smaller in size. This sheet may be of heavy paper or cardboard so as to be substantially self-supporting. The sheet is horizontally ruled as at 7, corresponding in their spacing to the rulings 4 and 4a of the panel and divided by vertical lines 8 into a number of vertical columns 9. These columns preferably indicate calendar weeks, and are so marked at the top. The sheet is sufficiently long horizontally to take care of advertising for a certain period, such as three months or as may be desired, and when such sheet is used up another one may be mounted on the panel to take its place or superimposed therein.

The sheet is adapted to be removably mounted on the front face of the panel so that the rulings 7 aline with the rulings 4, and said sheet is held in place by suitable means, such as spring clips 10 mounted on the panel and engaging the vertical edge portions of the sheet. In order to positively maintain the sheet in place vertically and so that the rulings 4 and 7 will definitely aline without relying on the clips, I may mount a forwardly projecting ledge 11 on the panel along the bottom and on which the lower edge of the sheet rests. In order to retain the proof sheets of any advertisements prepared and run in close association with the schedule device, impaling hooks 12 are mounted on the panel in depending relation along the bottom thereof, there being preferably one hook for each column 9.

In operation the advertisements as run for any manufacturer listed on the panel are indicated by check marks, such as at 13, in the proper corresponding positions in the columns 9, the proof sheet of each such advertisements being impaled on the corresponding hook 12. The merchant and the manufacturer's agent, at the expiration of a corresponding contract period, or at any time during such period, may thus have an instant and visual record of the performance of such contract.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In an advertising schedule device which includes an upstanding panel having an appropriately designated and horizontally ruled vertical column adjacent one side edge thereof, a paper sheet initially separate from the panel and ruled in corresponding relation to said column, and means removably securing said sheet on the panel with the column and sheet ruling in alinement; said sheet being of substantial length horizontally and relatively thick so that the sheet is substantially self-supporting, and said means comprising a ledge projecting from the panel along the bottom thereof to engage the lower edge of and support the sheet, and a pair of relatively small vertically spaced clips mounted on the panel and releasably engaging the sheet along each vertical edge portion thereof and adjacent its horizontal edges.

2. In an advertising schedule device which includes an upstanding panel having an appropriately designated and horizontally ruled vertical column adjacent one side edge thereof, a paper sheet initially separate from the panel and ruled in corresponding relation to said column, and means removably securing said sheet on the panel with the column and sheet ruling in alinement; the sheet having a plurality of appropriately designated, side-by-side vertical columns thereon, and a plurality of paper sheet impaling hooks mounted in connection with and depending from the panel at its lower edge, there being a hook for and vertically alined with each of said vertical columns on the sheet.

RICHARD J. FISHER.